United States Patent [19]

Dietrich et al.

[11] 4,371,242
[45] Feb. 1, 1983

[54] OBJECTIVE LENS EXCHANGING ARRANGEMENT IN A MICROFILM READER

[75] Inventors: Karl-Heinz Dietrich; Josef Gruber; Walter Rauffer, all of Munich; Peter Nassl, Gauting, all of Fed. Rep. of Germany

[73] Assignee: Agfa-Gevaert AG, Leverkusen, Fed. Rep. of Germany

[21] Appl. No.: 215,402

[22] Filed: Dec. 11, 1980

[30] Foreign Application Priority Data

Jan. 26, 1980 [DE] Fed. Rep. of Germany ....... 3002844

[51] Int. Cl.³ .............................................. G03B 3/00
[52] U.S. Cl. ................................................. 353/101
[58] Field of Search .................. 353/100, 101, 26 R, 353/27 R; 350/242, 246, 37, 38, 257, 256, 252, 255

[56] References Cited

U.S. PATENT DOCUMENTS 3,475,091 10/1969 Smitzer et al. .................. 353/101 X
4,123,699 10/1978 Persha et al. ..................... 353/26 R
4,135,778 1/1979 Lincoln ............................ 350/257 X

*Primary Examiner*—Harry N. Haroian

[57] ABSTRACT

In a microfilm reader, an objective lens tube removal or exchanging arrangement which includes a cylindrically shaped supporting casing for the objective lens tube. The objective lens tube is, for focusing purposes, slidably adjustably mounted along its optical axis in the cylindrically shaped supporting casing. The cylindrically shaped supporting casing has an opening which is sufficiently large to permit the removal or exchange of the objective lens tube therethrough in a direction substantially normal to the optical axis of the objective lens.

12 Claims, 4 Drawing Figures

OBJECTIVE LENS EXCHANGING ARRANGEMENT IN A MICROFILM READER

BACKGROUND OF THE INVENTION

The invention pertains to an objective lens exchanging arrangement in a microfilm reader apparatus. Such an arrangement is, for example, described in a German published patent application No. OS 2750458, published May 17, 1979, which corresponds to U.S. Pat. No. 4,215,915. An adjusting ring must be swung into a predetermined position for exchanging the objective lens in this known arrangement until the objective lens can be upwardly pulled out of the objective lens tube. There is, however, generally mounted in the conventional microfilm reading apparatus a deviating reflecting mirror immediately above the objective lens. Such an arrangement makes it difficult to gain access to the space immediately above the objective lens tube so that additional measures are necessary to permit an unencumbered objective lens exchange. For example, in German published application No. OS2808443, published Aug. 30, 1979, there is disclosed an arrangement in which the hood of the reader can be swung backwardly, whereby the space above the objective lens tube becomes accessible when the hood is so swung backwardly. An other arrangements for improving the accessability to the objective lens tube is described in German published application No. OS2632934, published Jan. 26, 1978, which corresponds to U.S. Pat. No. 4,244,641. In this known arrangement the objective lens tube is mounted on a sliding support arrangement in the microfilm reader. This sliding support arrangement is pulled out or pushed in for purposes of exchanging the objective lens.

The afore-described known arrangements for facilitating the exchange of the objective lens have proven not to be fully satisfactory, because they are either too complex or too difficult to operate.

SUMMARY OF THE INVENTION

It is a general object of this invention to provide an objective lens exchanging arrangement in a microfilm reader, which makes possible to exchange the objective lens in a simple and rapid manner.

With the arrangement of the invention it is no longer necessary to gain access to the upper or lower region adjacent to the endface of the cylindrically shaped lens support member by means of a complex manipulation or by means of additional technical means. Rather the objective lens can be exchanged in a simple manner through the opening provided in the upper cover surface of the objective lens support means. For this purpose the objective lens support means includes a region confronting the microfilm strip which is closed or is at least partially closed about an angle in excess of 180° and in which the objective lens tube is guided in its operative position. Adjoining this region is an open region which subtends an arc of at least 180° of the circumference of the cylindrically shaped objective lens support means. The objective lens tube is inserted through this opening into the inner space of the objective lens tube support means and thereafter is slid in the direction of the microfilm towards it, so that the closed region of the objective lens support means surrounds the objective lens tube when it is in its operative position.

The arrangement of the invention also provides for the use of a rotary prism with which the angular position of the projected image can be adjusted. Thus, when the rotary prism is included in the arrangement a further closed region adjoins the open region of the objective lens support means. This closed region is also disposed in the objective lens support means at the end distant from the microfilm and includes a peripheral closed region or partially open region which subtends an angle in excess of 180° and in which the rotary prism is rotatably mounted.

The rotary prism can advantageously be slidably adjustably mounted in the objective lens support means in the direction of the optical axis. This rotary prism is under the influence of a force acting in the direction towards the microfilm, for example, the force of gravity or a spring force, so that the rotary prism abuts against the objective lens tube when it is in the operative position, which provides for a correct distance at all times of the rotary prism from the objective lens tube independent from the physical length of the objective lens being used in the arrangement. The rotary prism and objective lens tube are thereby mounted in the simplest manner in a cylindrically shaped objective support means.

In accordance with a further feature of the invention, it is provided that the objective lens tube bears against an adjusting ring under the influence of a force acting in the direction of the microfilm, for example, a spring force or simpler yet the gravitational force, whereby the end face of the objective lens tube which confronts the microfilm bears against the confronting endface of an adjusting ring screwed onto the objective lens support means. By means of such an arrangement a slidable focusing adjustment in the direction of the optical axis can be attained by turning the adjusting ring of the objective lens support means.

The objective lens tube is preferably mounted in the objective lens support means in a non-rotatable manner, so that in the border region of the image field of the objective lens, objective lens distortions, which may possibly be present with respect to its angular position, are directed in such a way that they are positioned at all times outside of the effectively used rectangular image region. The non-rotatability of the objective lens tube can be obtained in a particularly simple manner by having the two side surfaces of the opening of the objective lens support means extend parallel to the optical axis and by making the support surfaces of the objective lens tube axially parallel and having them coact with the side surfaces of the opening of the objective lens support means and thereby prevent a rotation of the objective lens tube in the objective lens support means.

In accordance with a further feature of the invention there is provided on the objective lens tube a handle which facilitates the exchange of objective lenses. This handle extends in a substantially radial direction from the objective lens tube and projects, when in an operative position, through the opening in the objective lens support means.

BRIEF DESCRIPTION OF THE DRAWINGS

These and other objects of the present invention are realized and illustrated in the single preferred embodiment shown in the accompanying drawings.

DESCRIPTION OF THE PREFERRED EMBODIMENT

Figure 2:
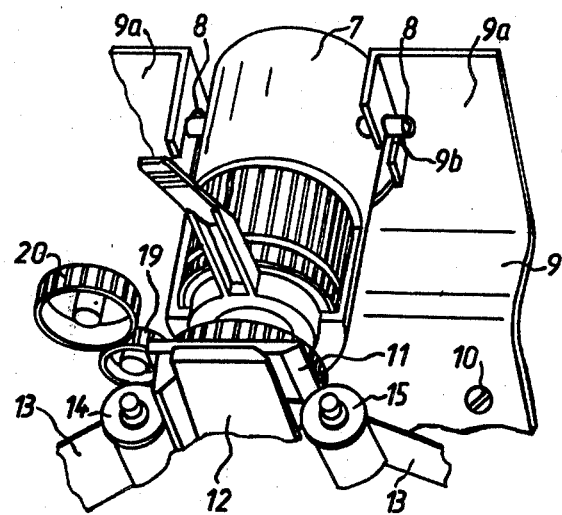
FIG. 2 is a perspective view of the objective lens exchange arrangement in accordance with FIG. 1.
Figure 3:
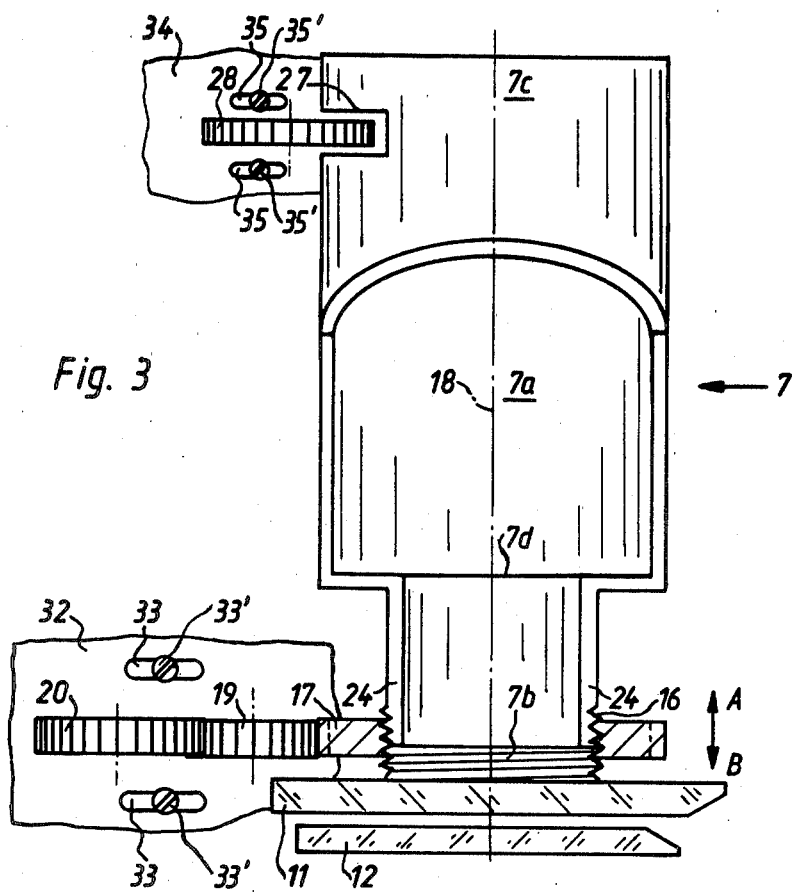
FIG. 3 is a plan view of the objective lens exchange arrangement in accordance with FIG. 2, partially in cross-section along the optical axis, wherein the objective lens and rotary prism are not shown as mounted.

As is illustrated in FIGS. 2 and 3, a pair of confronting glass plates 11 and 12, which define between them a guide slot, through which the microfilm strip 13 is guided along an exactly defined image plane. The microfilm strip 13 is transported between guide rollers 14, 15, (see FIG. 2) through the guide slot between the glass plates 11, 12.

Figure 4:
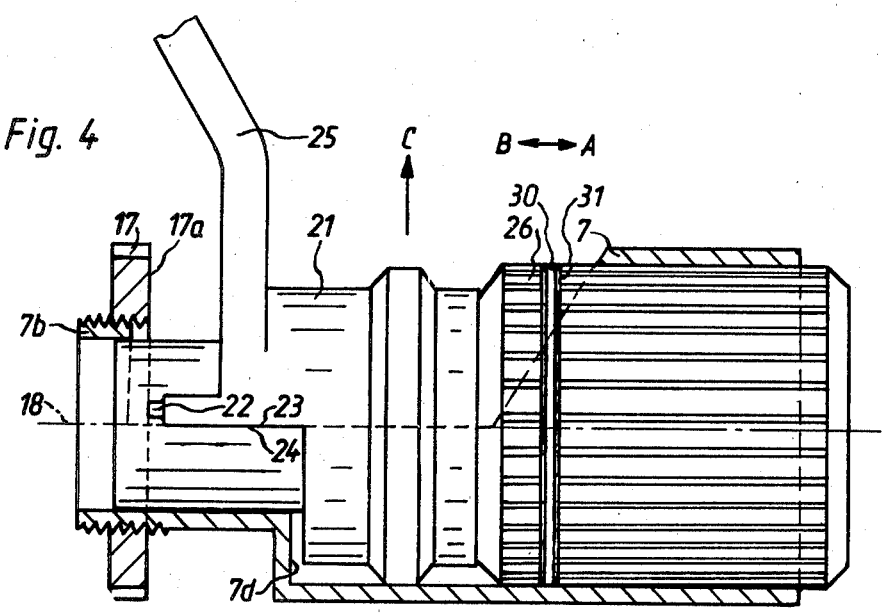
FIG. 4 is a further cross-sectional view of the objective lens exchange arrangement in accordance with FIG. 2, along the plane normal to the cross-sectional plane of FIG. 3 in which the objective lens and rotary prism are shown mounted in the arrangement.

As can be, for example, clearly noted in FIGS. 3 and 4, the cylindrical casing of the cylindrical objective lens support means 7 includes an opening 7a which is adjoined in the direction of the glass plate 11 by a closed region 7b and opposite thereto is adjoined by a closed region 7c. The end of the objective lens support tube which confronts the glass plate 11 is provided with a threaded portion 16 on which an adjusting ring 17 is threadably mounted. By turning the adjusting ring 17 the objective lens tube is moved in the direction of the double arrow A-B along the optical axis 18. (See FIG. 4). The adjusting ring 17 is formed as a gear wheel, which meshes with a further gear wheel 19, which in turn meshes with a handgear wheel 20 for focusing (see also FIG. 1). The handgear wheel 20 extends through a slot on the upper front plate 3 so that the person using the microfilm reader can adjust and focus the objective lens by turning the focusing hand wheel 20.

The wheels 19 and 20 are rotatably mounted on a sheet metal plate 32. The sheet metal plate 32 has longitudinal slots 33 through which screws 33' extend. The screws 33' in turn support the axle (non-illustrated), of the wheel 20. Thus by adjusting the position of the screws 33' the entire gear train including the wheels 19 and 20 for the objective lens support means 7 can be adjusted for its optimum torque and gear teeth meshing effect.

FIG. 4 illustrates the objective lens support means 7 shown with an objective lens tube 21 and rotary prism 26 shown mounted therein. The end of the objective lens tube 21 which confronts the transparent glass plates 11, 12 is guided within the closed region 7b of the objective lens support means 7. The opposite end of the objective lens tube 21 is disposed within the open region 7a (see FIG. 3) of the objective lens supporting means 7. The objective lens tube 21 has a pair of forwardly projecting studs 22, laterally disposed and parallel to the optical axis 18. A pair of lateral support surfaces 24 of the objective lens supporting means contact the projecting studs 22 or are spaced a small distance therefrom. This arrangement prevents rotational displacement of the objective lens tube 21 when it is in its operative position, so that at all times a defined angular position of the objective lens with respect to the micro picture is obtained.

Figure 1:
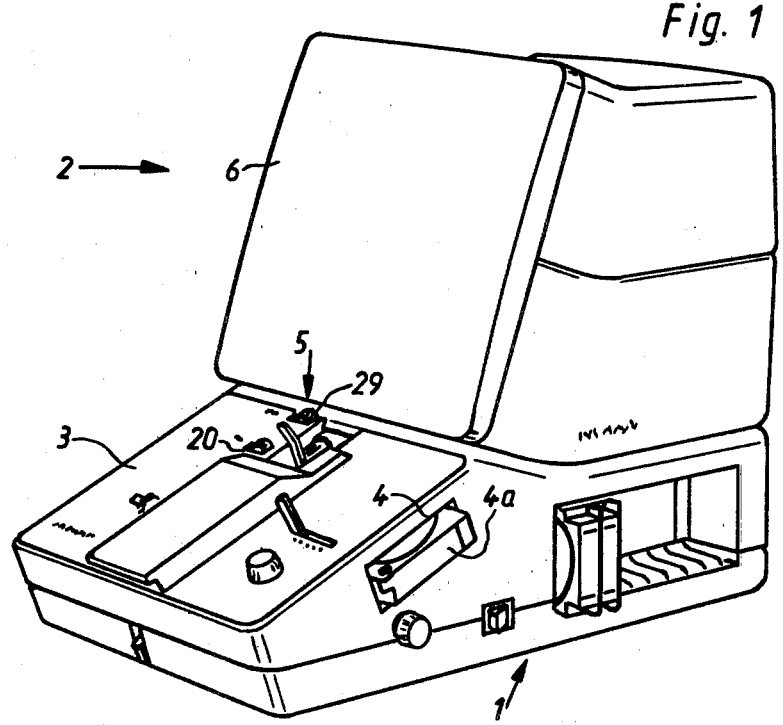
FIG. 1 is a perspective view of a microfilm reading apparatus having the objective lens exchange arrangement of this invention.

A handle 25 extends from the objective lens tube 21 and is integral therewith (see FIG. 1). The handle 25 projects from the upper front plate 3 (see FIG. 1) and therefore can be easily grasped by the user of the microfilm reader. When the user of the microfilm reader wishes to clean or exchange the objective lens, then he is only required to grip the handle 25 and to slide the objective lens in the direction of the arrow A until the objective lens is released from under the ring 7b, respectively the adjusting ring 17, and can be removed from the microfilm reader in the direction of the arrow C through the opening 7a of the objective lens supporting means 7. When the objective lens tube is to be reinserted into the microfilm reader, the same steps are carried out in the inverse order. The objective lens exchange thus can be carried out by a single manual manipulation, which can be carried out at all times by means of the use of one hand in a simple manner without requiring any kind of intricate manipulations with the microfilm reader.

In the rearward portion of closed region 7c of the objective lens supporting means 7 there is rotatably mounted a rotary prism 26, which is in the form of a cylindrical body that is freely slidably movable in the direction of the optical axis 18 and which bears with its front face against the objective lens tube 21 due to its own dead weight. The casing of the rotary prism 26 includes a toothed portion which coacts with a gear wheel 28 projecting into the objective lens supporting means rear end 27 (see FIG. 3). The gear wheel 28 meshes with a further handgear wheel 29 (see FIG. 1) which is used to adjust the rotary prism of the microfilm reader. In this manner the rotary prism 26 can be rotated into the desired angular position by adjusting the handgear wheel 29.

The prism body proper is mounted within the cylindrical body 26 and is eccentrically mounted for optical purposes. In order to achieve a uniform image rotation, there is provided a compensating weight in the body 26 which has not been illustrated in detail.

The toothing on the periphery of the rotary prism body 26 extends along its entire axial length so that the gear wheel 28 remains continuously in mesh, independent from the fact that objective lens tubes of radically different axial lengths can be used in the arrangement. Even if the objective lens tube 21 is removed from the objective lens supporting means 7 and the rotary prism 26 slides in the direction of the arrow B until it abuts against the vertical portion 7d, the toothed portion of the rotary prism body 26 and the gear wheel 28 will remain in mutually meshing engagement.

In order to avoid a sliding out of the rotary prism body 26 from the objective lens supporting means 7 in the direction of the arrow A, the tubing along the rotary prism body 26 is provided at the end facing the objective lens with an annular groove 31 in which a spring ring 30 is outwardly biasingly mounted. The rotary prism body 26 can therefore only slide in the direction of the arrow A until the teeth of the wheel 28 come in engagement with the spring ring 30. When it is desired to remove the rotary prism body 26 from the objective lens support means 7 the rotary prism body 26 can be easily pushed out of the objective lens supporting means which is quite readily possible due to its floating type mounting. The wheels 28 and 29 forming a second gear train in the arrangement are also adjustably mounted on the sheet metal plate 34 which is provided with longitudinal slots 35 into which the screws or bolts 35' extend.

Thus the gear train formed by the wheels 28 and 29 is supported by the pairs of screws or bolts 35' in a manner not further illustrated in detail and the gear train can also be adjustably mounted within the microfilm reader in a manner similar to the gear train formed by the wheels 20, 19.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. In a microfilm reader, an objective lens tube removal or exchanging arrangement, comprising in combination,
   a base through which a microfilm is adapted to be guided;
   an objective lens tube;
   a cylindrically shaped casing operatively mounted in said base and adapted to slidably adjustably support said objective lens tube therein along its optical axis, said casing having an opening sufficiently large to permit the removal or exchange of the objective lens tube therethrough in a direction substantially normal to the optical axis thereof,
   said casing further including a first closed portion which confronts said microfilm, said first closed portion subtends an arc in excess of 180° about the axis of said cylindrically shaped casing, said opening adjoining said first closed portion, said objective lens tube being guidingly supported along its optical axis in the first closed portion of said casing;
   said casing further including a second closed portion which also subtends an arc in excess of 180° about the axis of said cylindrically shaped casing, said opening also adjoining said second closed portion at its end opposite the end at which it adjoins the first closed portion; and
   a rotary prism being rotatably adjustably mounted in said second closed portion.

2. In a microfilm reader, an objective lens tube removal or exchanging arrangement as set forth in claim 1, wherein said rotary prism is also slidably mounted in said second closed portion under the influence of a force biasing the rotary prism toward the microfilm in the direction of its optical axis.

3. In a microfilm reader, an objective lens tube removal or exchanging arrangement as set forth in claim 1, wherein said objective lens tube is biased toward the microfilm, an adjusting ring threadably mounted on said cylindrically shaped casing at the end thereof which confronts the microfilm, said objective lens tube being biased against and in abutting contact with said adjusting ring, so that by turning said adjusting ring said objective lens tube is slidably moved along its optical axis in said cylindrically shaped casing.

4. In a microfilm reader, an objective lens tube removal or exchanging arrangement as set forth in claim 1, wherein said objective lens tube is mounted in said cylindrically shaped casing in a non-rotatable manner.

5. In a microfilm reader, an objective lens tube removal or exchanging arrangement as set forth in claim 4, wherein said cylindrically shaped casing has a pair of side surfaces which extend parallel to the optical axis of the objective lens tube mounted therein, and said objective lens tube having a pair of side bearing surfaces extending parallel to the optical axis thereof, said pairs of side surfaces of said objective lens tube and cylindrically shaped casing coacting to prevent rotation of said objective lens tube in said casing.

6. In a microfilm reader, an objective lens tube removal or exchanging arrangement as set forth in claim 1, wherein said objective lens tube includes a handle laterally extending therefrom which facilitates the removal or exchange of the objective lens tube.

7. In a microfilm reader, an objective lens tube removal or exchanging arrangement as set forth in claim 6, wherein said handle extends in a substantially radial direction from said objective lens tube and projects out of said opening in said cylindrically shaped casing when said objective lens tube is disposed in an operative position therein.

8. In a microfilm reader, an objective lens tube removal or exchanging arrangement as set forth in claim 3, wherein said adjusting wheel has a toothed portion and including at least one first gear wheel rotatably mounted in said base and in meshing engagement with said toothed portion of said adjusting ring.

9. In a microfilm reader, an objective lens tube removal or exchanging arrangement as set forth in claim 2, wherein said rotary prism is provided at its outer periphery with a toothed portion which extends substantially along its entire axial length.

10. In a microfilm reader, an objective lens tube removal or exchanging arrangement as set forth in claim 9, including at least one second gear wheel adjustably rotatably mounted in said base and in meshing engagement with said toothed portion of said rotary prism.

11. In a microfilm reader, an objective lens tube removal or exchanging arrangement as set forth in claim 10, including an outwardly biased annular ring mounted on the outer periphery of said rotary prism, said annular ring being adapted to engage said second gear wheel to thereby prevent the rotary prism from sliding out of the cylindrically shaped casing.

12. In a microfilm reader, an objective lens tube exchanging arrangement having an exchangeable objective lens tube and a cylindrically shaped casing which at least partly surrounds said objective lens tube when it is mounted therein, a first portion of said casing confronts the microfilm of the reader, said first portion subtends an arc about the optical axis of the objective lens tube which is in excess of 180°, a second portion of said casing adjoins said first portion, and defines an opening which subtends an arc of at least 180° about said optical axis, said objective lens tube being adapted to be introduced into said casing via said opening in a direction substantially normal to said optical axis, said first portion of said casing including stop means which is adapted to contact the axial end face of said objective lens tube which confronts said microfilm to thereby operatively position said lens tube in said casing.

* * * * *